United States Patent
Hughes et al.

(10) Patent No.: US 7,948,966 B2
(45) Date of Patent: May 24, 2011

(54) MULTI-METRIC ROUTING CALCULATIONS

(75) Inventors: Timothy J. Hughes, San Diego, CA (US); Wendell Y. Kishaba, San Diego, CA (US); Chau T. Trinh, Fullerton, CA (US)

(73) Assignee: Powerwave Cognition, Inc., Santa Ana, CA (US)

(*) Notice: Subject to any disclaimer, the term of this patent is extended or adjusted under 35 U.S.C. 154(b) by 0 days.

(21) Appl. No.: 12/242,747

(22) Filed: Sep. 30, 2008

(65) Prior Publication Data
US 2009/0116393 A1    May 7, 2009

Related U.S. Application Data

(60) Provisional application No. 60/976,730, filed on Oct. 1, 2007, provisional application No. 60/976,735, filed on Oct. 1, 2007, provisional application No. 60/976,740, filed on Oct. 1, 2007, provisional application No. 60/976,744, filed on Oct. 1, 2007, provisional application No. 60/976,747, filed on Oct. 1, 2007, provisional application No. 60/976,748, filed on Oct. 1, 2007.

(51) Int. Cl.
*H04L 12/28* (2006.01)
(52) U.S. Cl. .......................................... 370/351
(58) Field of Classification Search .......... 370/351–363, 370/395.4, 395.41, 395.42, 395.43, 395.5, 370/395.51, 395.52
See application file for complete search history.

(56) References Cited

U.S. PATENT DOCUMENTS

| 6,542,467 | B2 * | 4/2003 | Umayabashi ................. 370/236 |
| 7,062,687 | B1 | 6/2006 | Gfeller |
| 7,616,565 | B2 | 11/2009 | Park et al. |
| 2002/0150099 | A1 * | 10/2002 | Pung et al. .................... 370/390 |
| 2003/0202468 | A1 * | 10/2003 | Cain et al. .................... 370/229 |

(Continued)

FOREIGN PATENT DOCUMENTS
KR    20020055285    7/2002
(Continued)

OTHER PUBLICATIONS

"International Search Report", ISR of Jan. 28, 2009 for PCT Application No. PCT/US2008/077331, (Jan. 28, 2009).

(Continued)

*Primary Examiner* — Kwang B Yao
*Assistant Examiner* — Juvena Loo
(74) *Attorney, Agent, or Firm* — Strategic Patents, P.C.

(57) ABSTRACT

In a Mobile Ad Hoc Network (MANET), multi-metric information is gathered and applied to a cost-based route calculation. In particular, each node gathers resource metrics from neighboring of nodes, along with data rate and reliability information for data links to and from the node. This information is applied to a costing algorithm such as Dykstra' Open Shortest Path First algorithm to obtain routes through the network. This approach may be adapted with suitable modifications to use with unicast traffic or with a multicast forwarding group.

18 Claims, 4 Drawing Sheets

U.S. PATENT DOCUMENTS

| | | | |
|---|---|---|---|
| 2005/0047353 A1* | 3/2005 | Hares | 370/255 |
| 2005/0053005 A1* | 3/2005 | Cain et al. | 370/235 |
| 2005/0083848 A1* | 4/2005 | Shao et al. | 370/238 |
| 2006/0007947 A1* | 1/2006 | Li et al. | 370/432 |
| 2006/0262786 A1* | 11/2006 | Shimizu et al. | 370/389 |
| 2006/0268879 A1* | 11/2006 | Xhafa et al. | 370/392 |
| 2007/0237081 A1* | 10/2007 | Kodialam et al. | 370/235 |
| 2007/0253403 A1* | 11/2007 | Kodialam et al. | 370/351 |
| 2008/0159138 A1* | 7/2008 | Shepherd et al. | 370/230.1 |
| 2010/0030909 A1* | 2/2010 | Magharei et al. | 709/231 |
| 2010/0169937 A1* | 7/2010 | Atwal et al. | 725/68 |

FOREIGN PATENT DOCUMENTS

| | | |
|---|---|---|
| WO | WO-0128170 | 4/2001 |
| WO | WO-0128170 A2 | 4/2001 |
| WO | WO-03/090083 A1 | 10/2003 |
| WO | WO-2009/046134 A3 | 4/2009 |
| WO | WO-2009/046143 A2 | 4/2009 |

OTHER PUBLICATIONS

Vaidya, Nitin et al., "Distributed Fair Scheduling in a 1-25, 66-85", *IEEE Trans. On Mobile Computing*, vol. 4, No. 6, (Nov. 2005),pp. 616-629.

Shiann-Tsong, S. et al., "A Bandwidth AllocationiSharinglExtension Protocol26-45", *IEEE Journal on Selected Areas in Communications*, vol. 19, No. 10, (Oct. 2001),pp. 2065-2080.

Qi, Xue et al., ""Ad hoc QoS on-demand routing (AQOR) in mobile ad hoc networks,"", *Journal of Parallel and Distributed Computing,*, (2003),pp. 154-165.

PCT_searchreport, "ISR Feb. 6, 2008", PCT/US2008/078501,(Apr. 28, 2009),all.

* cited by examiner

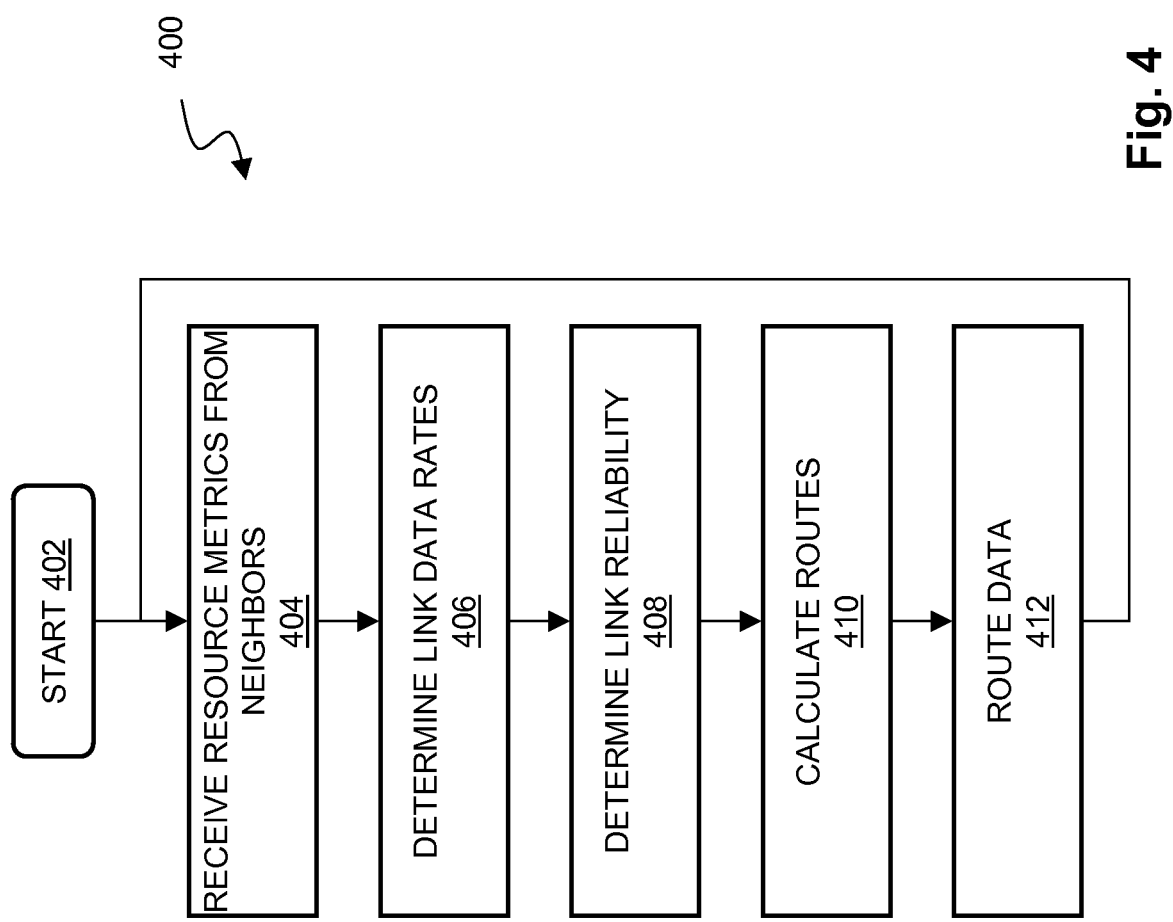

MULTI-METRIC ROUTING CALCULATIONS

RELATED APPLICATIONS

This application claims the benefit of the following U.S. Provisional patent applications, each of which is incorporated by reference herein in its entirety:

U.S. App. No. 60/976,730 filed on Oct. 1, 2007;
U.S. App. No. 60/976,735 filed on Oct. 1, 2007;
U.S. App. No. 60/976,740 filed on Oct. 1, 2007;
U.S. App. No. 60/976,744 filed on Oct. 1, 2007;
U.S. App. No. 60/976,747 filed on Oct. 1, 2007; and
U.S. App. No. 60/976,748 filed on Oct. 1, 2007.

STATEMENT REGARDING FEDERALLY SPONSORED RESEARCH

This invention was made with support of the United States Government under Contract MDA972-01-9-0022. The United States Government may have certain rights in the invention.

BACKGROUND

This application relates to traffic routing in a mobile ad hoc network, and more particularly to the use of various physical layer and network metrics to improve cost-based route calculations. There remains a need for techniques to route traffic efficiently in the context of a mobile ad hoc network where traffic demands and network topologies change frequently.

SUMMARY

In a Mobile Ad Hoc Network (MANET), multi-metric information is gathered and applied to a cost-based route calculation. In particular, each node gathers resource metrics from neighboring of nodes, along with data rate and reliability information for data links to and from the node. This information is applied to a costing algorithm such as Dykstra' Open Shortest Path First algorithm to obtain routes through the network. This approach may be adapted with suitable modifications to use with unicast traffic or with a multicast forwarding group.

In one aspect, a method disclosed herein includes: receiving a resource metric from each one of a plurality of neighbors of a node, the resource metric indicative of network resources needed by the corresponding one of the plurality of neighbors, thereby providing a data link layer resource metric for a route calculation; determining a data rate for a link to each one of the plurality of neighbors using physical layer data that characterizes a rate of data selected according to the physical performance of a wireless communication channel, thereby providing a data rate metric for the route calculation; determining a reliability for a link to each one of the plurality of neighbors using physical layer data that characterizes a physical reliability of the wireless communication channel, thereby providing a reliability metric for the route calculation; and applying the reliability metric, the data rate metric, and the data link layer bandwidth metric to the route calculation to calculate a plurality of routes including a route for each one of a plurality of service levels.

In one aspect a computer program product disclosed herein includes computer executable code that, when executing on one or more computing devices, performs the steps of receiving a resource metric from each one of a plurality of neighbors of a node, the resource metric indicative of network resources needed by the corresponding one of the plurality of neighbors, thereby providing a data link layer resource metric for a route calculation; determining a data rate for a link to each one of the plurality of neighbors using physical layer data that characterizes a rate of data selected according to the physical performance of a wireless communication channel, thereby providing a data rate metric for the route calculation; determining a reliability for a link to each one of the plurality of neighbors using physical layer data that characterizes a physical reliability of the wireless communication channel, thereby providing a reliability metric for the route calculation; and applying the reliability metric, the data rate metric, and the data link layer bandwidth metric to the route calculation to calculate a plurality of routes including a route for each one of a plurality of service levels. The computer code may further perform the steps of receiving a data packet at the node, the data packet having a service level indicator; and routing the data packet according to the route for the service level.

In one aspect, a device disclosed herein includes a data source that provides a plurality of data packets; a memory storing neighborhood information for a plurality of neighboring nodes, the neighborhood information including a plurality of resource metrics indicative of network resources needed by each one of the plurality of neighboring nodes; a radio that provides an air interface to a mobile ad hoc network including links to a plurality of neighboring nodes; a signal processor that prepares the plurality of data packets for transmission over the air interface; and a router that calculates routes for at least one of unicast and multicast traffic using a Dykstra Open Shortest Path First algorithm weighted according to the plurality of resource metrics, and according to physical layer data available from the signal processor.

BRIEF DESCRIPTION OF THE DRAWINGS

The invention and the following detailed description of certain embodiments thereof may be understood by reference to the following figures wherein:

FIG. 4 is a flow chart of a process for multi-metric routing in a MANET.

DETAILED DESCRIPTION

The following description details certain embodiments of a dynamic segmentation and reassembly technique for use in packetizing data for transmission over wireless communication links. By tracking link quality based on local metrics and/or information shared among nodes in the network, data can be segmented and reassembled dynamically to provide more efficient use of communication links without requiring more overhead in individual packet headers. While the invention is described below in relation to Mobile Ad Hoc Networks, it will be understood that the principles of the invention may be suitably applied in any environment where link quality and/or transmission modes vary dynamically, and information relating to link quality is available to nodes participating in a network.

So-called "infrastructure" networks employ base stations at fixed locations to form a substantially fixed network infrastructure. The base stations may enable communication among the wireless devices of the network, between a wireless device and another device on another network, and so on.

This general approach is employed, for example, in 802.11 or WiFi networks, as well as in cellular telephony networks. By contrast, ad hoc wireless communications networks are formed in an ad hoc manner among any number of participating nodes that may periodically join, leave, or move within the ad hoc network. Although such networks do not belong to any fixed network infrastructure, they may support conventional network communications such as point-to-point or broadcast communications, and may be adapted for use with any of the Internet Protocols (e.g. IPv4, IPv6) or similar, well-established networking protocols.

In general, a Mobile Ad Hoc Network (MANET) is an ad hoc wireless network in which some (or all) of the participating devices—also referred to herein as "nodes"—are mobile. Thus the topography of a MANET may change not only as nodes enter and leave the network, but as nodes move relative to one another within the network. As the network topology changes, communications routes through the network may also vary in terms of availability and in terms of quality. While the invention(s) disclosed herein have broad applicability, they may be particularly useful in a MANET environment where the context of continuously changing node-to-node links poses challenges to, and opportunities for, maintaining traffic flow.

Figure 1:
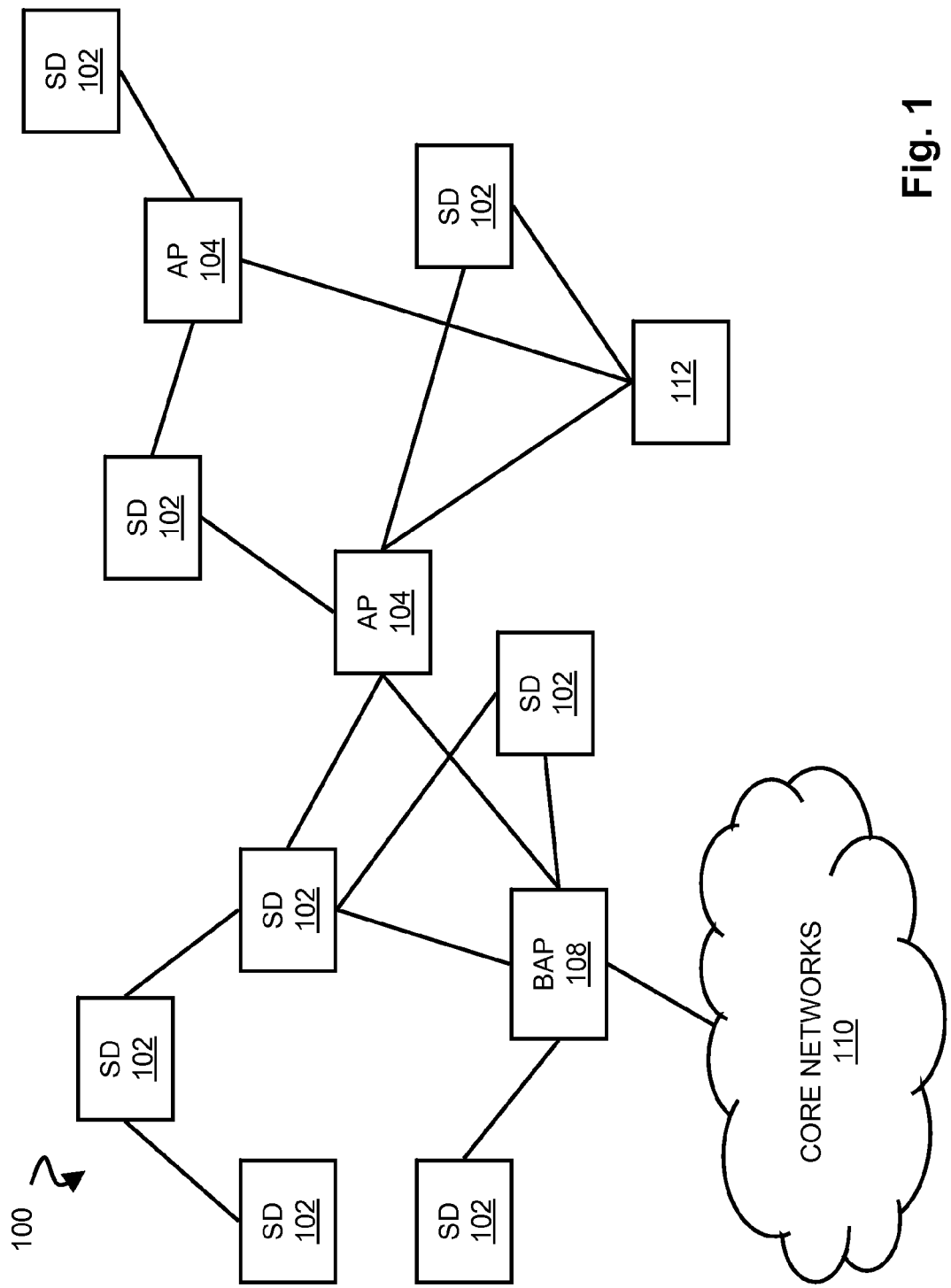
FIG. 1 is a block diagram of a Mobile Ad Hoc Network (MANET).

FIG. 1 shows a Mobile Ad Hoc Network (MANET) that may be used with the systems and methods described herein. In general, a MANET 100 may include subscriber devices 102, access points 104, and backhaul access points 108 (for coupling to a core network 110 such as the Internet), and subscriber devices 110, all generally interconnected as shown in FIG. 1. Without limiting the generality of the foregoing, one or more of the subscriber devices 102 may be a stationary device 112 that does not move within the MANET 100. It will be understood that the device-to-device links illustrated in FIG. 1 are for purposes of illustration only, and in no way are intended to limit the nature or number of links between devices in the MANET 100, which may be created, removed, and/or modified over time according to any corresponding protocols followed by the devices within the MANET 100. In general, the links among devices within the MANET 100 are wireless links, although wired links may optionally be employed in various locations such as between the backhaul access point 108 and the core networks 110. In order to maintain the MANET 100, typically one or more protocols are shared among the participating devices to control creation, removal, and modification of individual data links between devices, and to route traffic and control information among the devices. The term protocol as used herein generally refers to any and all such rules, procedures, and/or algorithms used in maintaining the MANET 100, unless a specific protocol is explicitly stated or otherwise clear from the context.

Subscriber devices 102 may include any general purpose nodes participating in the MANET 100 according to suitable protocols. It will be understood that while subscriber devices 102 may include terminal nodes that send or receive data, in a MANET 100 as described herein subscriber devices 102 may also suitably be employed as intermediate nodes to route traffic to and from other subscriber devices 102. Thus an ad hoc network as described herein is generally extensible, and as new subscriber devices 102 appear within the MANET 100, they may form a part of the MANET 100 fabric that routes traffic among other nodes. In general, subscriber devices 102 may include any network or computing devices that include a wireless interface, network protocol stack(s), and the like adapted to participate in the MANET 100. The Internet Protocol may usefully be employed in subscriber devices 102 within the MANET 100 in order to use well-established addressing schemes and the like. A subscriber device 102 may include without limitation a cellular phone, personal digital assistant, wireless electronic mail client, laptop computer, palmtop computer, desktop computer, video device, digital camera, electrical instrument, sensor, detector, display, media player, navigation device, smart phone, a wireless networking card, or any other device that might usefully participate in a network. In some embodiments subscriber devices may include a GPS receiver providing a position and timing reference. In embodiments, each subscriber device 102 may be authenticated and/or authorized before being granted access to the MANET 100.

Access points 104 may be provided to establish a permanent or otherwise generally stable infrastructure to the MANET 100. In one embodiment, the access points 104 may employ identical network functionality and protocol stacks as subscriber devices 102. However, an access point 104 may have a number of differences related to their dedicated function within the MANET 100. In one aspect, the access points 104 may have no associated computing device that originates or consumes network traffic. That is, the access points 104 may simply form a fixed mesh of participants in the MANET 100 and relay traffic among other network participants. An access point 104 may also include a physical connection to a power infrastructure so that it may be physically installed at a location and operate autonomously without requiring regular maintenance for battery changes and the like. In another aspect, access points 104 may include some minimal supplemental circuitry related to, e.g., status and diagnostics, or for receiving software updates and the like. This may improve continuity of coverage across a physical region where subscriber devices 102 may or may not be present with any regularity, and may ensure that wireless network resources are available in a desired area. In embodiments the access point 104 may be of a size and weight making it suitable for mounting and/or concealment in a variety of locations including indoor and outdoor locations, and including mounting on walls, floors, ground, ceilings, roofs, utility poles, and so forth.

Each access point 104 may include or utilize a timing reference such as any of the Network Timing Protocols described in RFC 778, RFC 891, RFC 956, RFC 958, RFC 1305, RFC 1361, RFC 1769, RFC 2030, and RFC 4330, all published by The Internet Engineering Task Force. Each access point may also, or instead, include a GPS receiver providing a position and timing reference. In embodiments the wireless access points 104 may have a greater transmit power and/or a greater antenna gain than mobile subscriber devices 102, thus providing greater physical coverage than some other devices within the MANET 100.

The MANET 100 may include one or more backhaul access points 108 that generally operate to connect nodes within the MANET 100 to a core network 110 such as the Internet. On one interface, a backhaul access point 108 may have a wireless radio interface, protocol stack(s) and other components of other nodes within the MANET 100. On another interface, the backhaul access point 108 may provide any suitable interface to the core network 110. The backhaul access point 108 may, for example, be deployed at a fiber access point or the like that provides high-speed data capacity Internet traffic. For example and without limitation, the fiber access point may include a Gig-E router site or an OC-3/12 add-drop multiplexer site. In an embodiment the backhaul access point 108 may include two Gig-E interfaces for backhaul connections. It will be understood that any number of a variety of suitable interfaces for backhaul connections may be usefully employed with a backhaul access point 108 as described herein.

A backhaul access point 108 may serve multiple access points 104 within the MANET 100, and may distribute network load across those access points 104. Alternatively, a single backhaul access point 108 may serve a single access point 104. In some embodiments, the number of access points 104 served by a backhaul access point 108 may relate to the amount of intra-MANET traffic and extra-MANET traffic, the nature and direction of multicast versus unicast data, and so forth. This association between backhaul access points 108 and access points 104 may change from time to time depending on the presence of other subscriber devices 102 within the area, network conditions, and so forth. In some cases an access point 104 may for a time be associated with more than one backhaul access point.

The core networks 110 may provide access to network resources outside the MANET 100. The core networks 114 may connect disparate, geographically remote and/or local instances of the MANET 100 to form a single network. The core networks 110 may include any and all forms of IP networks, including LANs, MANs, WANs, and so on. The core networks 110 may also or instead include the public Internet. In other embodiments the core networks 110 may consist exclusively of a single zone of administrative control, or a number of zones of administrative control, or some combination of an administrative zone and any of the foregoing.

The stationary device 112 may include any subscriber device 102 that, for whatever reason, does not physically move within the MANET 100. In general, such fixed physical points within the MANET 100 may provide useful routing alternatives for traffic that can be exploited for load balancing, redundancy, and so forth. This may include, for example, a fixed desktop computer within the MANET 100.

Details of various MANET 100 protocols—referred to collectively herein as the MANET Wireless Protocol (MWP)—are provided below. In general, any of the nodes above that participate in the MANET 100 according to the MWP may include a hardware platform enabling radio software and firmware upgrades, which may include for example a dedicated or general purpose computing device, memory, digital signal processors, radio-frequency components, an antenna, and any other suitable hardware and/or software suitable for implementing the MWP in participating nodes.

In embodiments, any of the foregoing devices, such as one of the access points 104, may also include an adapter for other networks such as an Ethernet network adapter or equivalent IP network adapter, router, and the like, so that non-MANET 100 equipment can participate in the MANET 100 through the device. It will also be appreciated that, while a connection to other core networks 110 is shown, this connection is optional. A MANET 100 (with or without fixed access points 104) may be maintained independently without connections to any other networks, and may be usefully employed for the sole purpose of trafficking data among subscriber devices 102.

Figure 2:
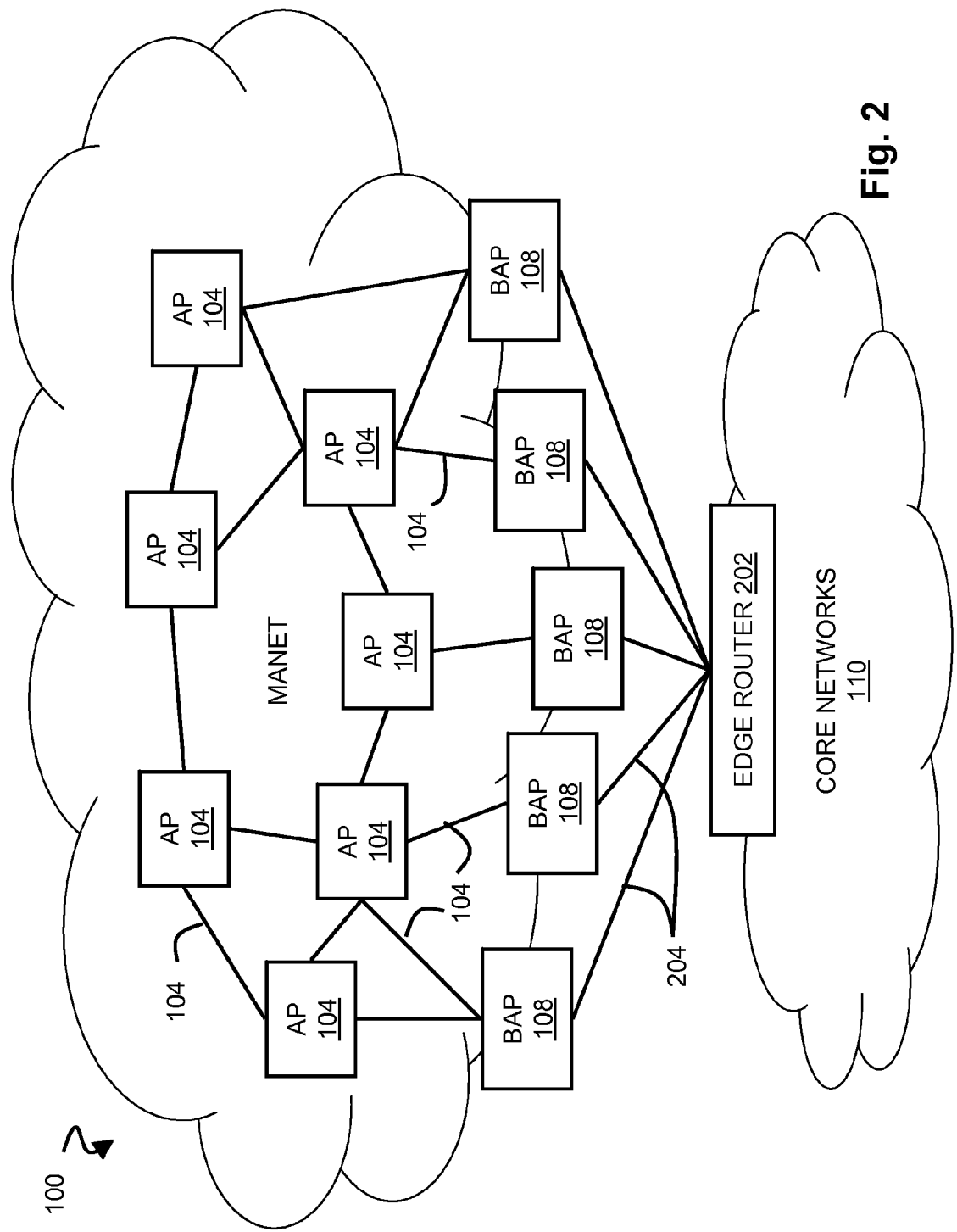
FIG. 2 is a block diagram of a MANET having multiple backhaul access points.

FIG. 2 is a block diagram of a MANET having multiple backhaul access points. In general, the MANET 100 may include subscriber devices 102 (not shown), access points 104, and backhaul access points 108 for connecting to core networks 110, and an edge router 202 that facilitates routing between the MANET 100 and the core networks 110.

The edge router 202 may include any devices or systems for maintaining connectivity between the MANET 100 and the core networks 110, and may further support or enhance network activity within the MANET 100. For example, the edge router 202 may include an industry standard and/or proprietary Address Resolution Protocol server, an application server, a Virtual Private Network server, a Network Address Translation server, a firewall, a Domain Name System server, a Dynamic Host Configuration Protocol server, and/or an Operations, Administration, Maintenance and Provisioning server, as well as any combination of the foregoing. These various components may be integrated into the edge router 202, or may be provided as separate (physical and/or logical) systems that support operation of the edge router 202. These supporting systems may in general support operations such as broadband Internet connectivity within the MANET 100 and the like, broadcast communications crossing between the MANET 100 and the core networks 110, and so forth, as well as the use of multiple backhaul access points 108 to efficiently route inter-MANET traffic among subscriber devices 102.

Figure 3:
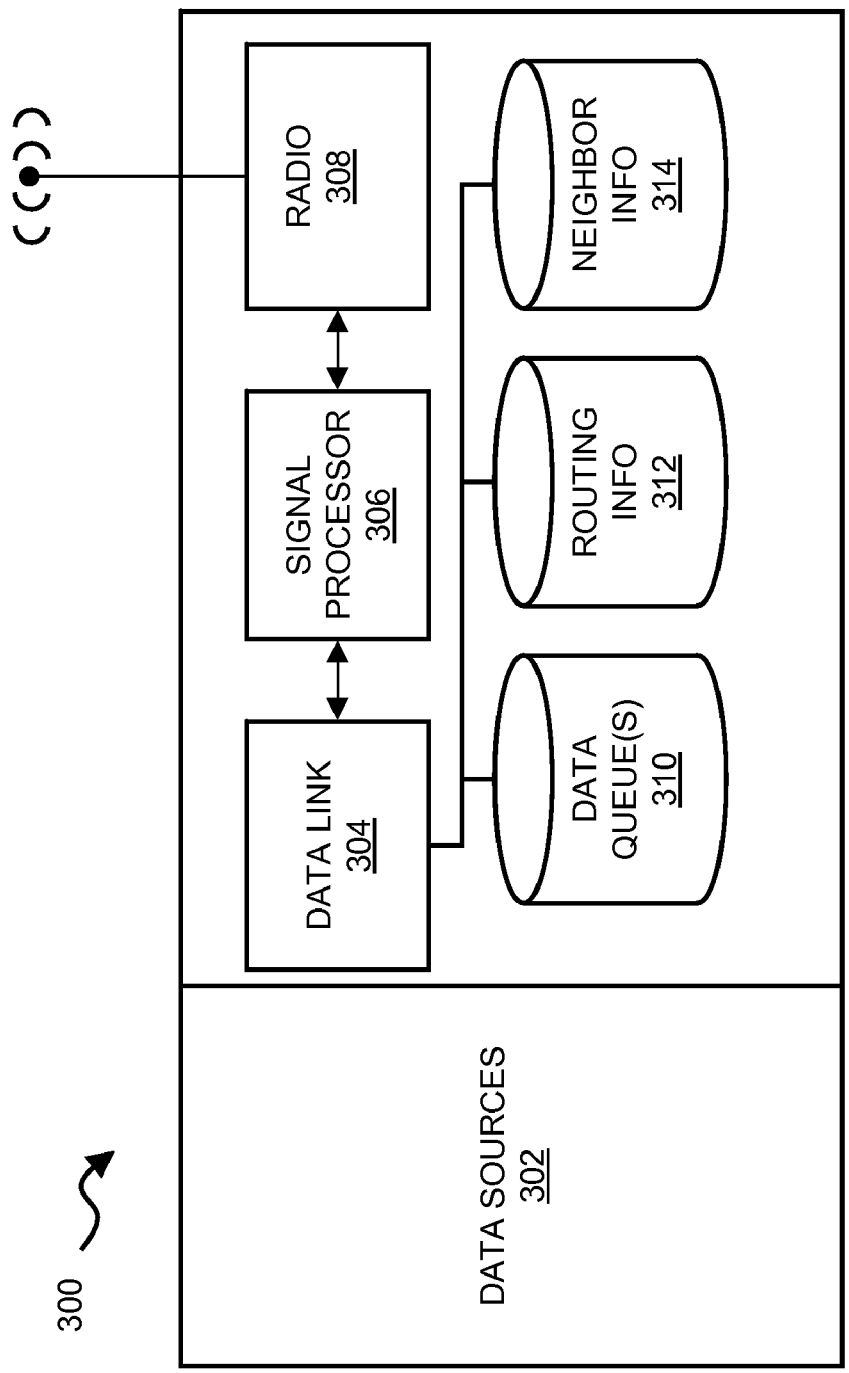
FIG. 3 is a block diagram of a node in a MANET.

FIG. 3 is a block diagram of a node in a MANET. The node may be any of the devices described above, such as a subscriber device 102, access point 104, or backhaul access point. In general the node 300 may include data sources 302, a data link 304, a signal processor 306, a radio 308, data queues 310, routing information 312, and neighborhood information 314. It will be understood that the following description is general in nature, and that numerous arrangements of processing, storage, and radio frequency hardware may be suitably employed to similar affect. This description is intended to outline certain operations of a MANET node relevant to the systems and methods described herein, and in no way limits the invention to the specific architecture shown in FIG. 3.

The data sources 302 may include any applications or other hardware and/or software associated with the node 300. This may include, for example, programs running on a laptop or other portable computing device, a web server or client, a multimedia input and/or output sources such as a digital camera or video, and so forth. More generally any device, sensor, detector, or the like that might send or receive data may operate as a data source 302 in the node 300. It will be further understood that some nodes such as access points 104 may not have independent data sources 302, and may function exclusively as MANET 100 network elements that relay data among other nodes and/or provide network stability as generally described above.

The data link 304 may include hardware and/or software implementing data link layer functionality such as neighbor management, segmentation and reassembly of data packets, Quality of Service (QoS) management, data queue servicing, channel access, adaptive data rates, and any other suitable data link functions. In general, the data link 304 controls participation of the data sources 302, and more generally the node 300, in a MANET. It will be understood that the data link 304 in FIG. 3 may implement any number of lower layer (e.g., physical layer) or higher layer (e.g., routing, transport, session, presentation, application) protocols from a conventional Open Systems Interconnection (OSI) Model, or any such protocols and related functions may be implemented elsewhere within the node 300, such as in an IP stack executing on the data source 302, or in firmware within the signal processor 306 or radio 308, or in additional functional blocks not depicted in FIG. 3. For example, routing protocols may be implemented within hardware/software of the data link 304 in order to ensure that nodes in the MANET 100 share appropriate routing functions. Thus it will be appreciated that while the certain elements discussed herein might suitably be placed within the data link layer of a formal protocol stack, the systems and methods of this disclosure might also or instead be implemented with variations to a conventional protocol stack, or without any formal protocol stack whatsoever.

The data link 304 may include a link manager that collects neighbor information from the data link layer, and may form and maintains the neighborhood information 314 for the node 300. This table may be used to establish routes to neighbors, and may be updated periodically with information from one and two hop neighbors as described further below. The link manager may monitor statistics on all active links for a node on a link-by-link basis in order to support link quality calculations and other functions described herein.

The signal processor 306 may include waveform processing and timing functions associated with transceiving data at the node 300. This may include, for example, network timing, time-slot and/or frame-based waveform configuration, maintenance of one or more families of Orthogonal Frequency Division Multiplexing waveform modes (or other transmit mode waveforms), receiver detection of waveform modes, error correction coding, and so forth. In general, the signal processor 306 may be implemented in any suitable combination of digital signal processors, field programmable gate arrays, application-specific integrated circuits, microprocessors, or other general or special-purpose computing devices.

In one embodiment, a family of Orthogonal Frequency Division Multiplexing (OFDM) waveforms may be employed for adaptive data rate communications. The modes of the OFDM waveforms may, for example, include 7.2 MHz Quadrature Phase-Shift Keying (QPSK), 4.8 MHz QPSK, 2.4 MHz QPSK, 1.2 MHz QPSK, 1.2 MHz Binary Phase-Shift Keying (BPSK), or the like. The effective data rate for transmit waveforms may be affected by other parameters such as error correction. In order to facilitate implementation of an adaptive rate system, the transmit modes may be organized into an ordered list of monotonically increasing data rates matched to correspondingly decreasing signal robustness, thus permitting unique mapping of link quality to transmit mode. In one aspect, the actual waveform mode selected to transmit data on a link may be adaptively selected according to any suitable evaluation of link quality for links to neighboring nodes.

The radio 308 in general operates to transmit data from the data queue(s) 310, as organized and encoded by the data link 304 and the signal processor 306 (along with any control information, packet header information, and so forth), over a wireless air interface to other nodes in a MANET, and to perform complementary data reception. The radio 308 may include any radio frequency analog circuitry and the like, and may be coupled to the signal processor 306 which converts data and control information between a digital representation used within the node 300, and an analog representation used in radio frequency communications with other nodes. In embodiments, a low power radio 308 may be employed, such as where the node 300 is a battery-powered mobile device. In other embodiments, a high-power radio 308 may be employed, such as where the node 300 is an access point or backhaul access point connected to a fixed power infrastructure. In an embodiment, the radio 308 and signal processor 306 provide adaptive data rate coding capable of changing transmit modes, error correction, and the like according to measured link quality.

The data queue(s) 310 may include any data for transmission from the node 300. This may include, for example, data from the data sources 302, data that is relayed by the node 300 from other nodes in the MANET, and/or control information scheduled for transmission within data packets from the node 300. The data queue(s) 310 may be organized in any suitable fashion, and may include a single first-in-first-out queue, multiple queues, prioritized queues, and the like. In one embodiment, the node 300 may include multiple prioritized queues to assist in providing various service levels, such as for QoS traffic. In general, data in the data queue(s) 310 is delivered according to any suitable queuing mechanism to the data link 304, signal processor 306, and radio 308 for transmission within the MANET.

Routing information 312 such as a routing or forwarding table may be provided to support routing functions by the node 300. In general, this may include, for example, a destination address or identifier, a cost of a path to the destination (using any suitably cost calculation), and a next hop on that path. Other information such as quality of service and other metrics for various routes and links may also be provided for more refined routing decisions.

Neighborhood information 314 may be maintained in a database, flat file, routing table, or other suitably organized volatile or non-volatile storage within the node 300. The neighborhood information 314 generally supports the creation and maintenance of the MANET as well as routing functions of each MANET node. Within the MANET, each node may interact with other nodes to autonomously identify and maintain local network connections, shift capacity, dynamically form routes throughout the network, and so on. The routing functions of the node (as supported by the neighborhood information 314) may accommodate delay-sensitive (e.g. voice) traffic, delay-tolerant traffic with quality of service (QoS) prioritization, and so on.

The neighborhood information 314 may include an identification of neighboring nodes along with information relating to those nodes. This may include one-hop neighbors (i.e., neighboring nodes in direct wireless communication with the node 300), two-hop neighbors (i.e., neighboring nodes that communicate with the node 300 through only one other node), or any other nodes or participants within the MANET. In one aspect, neighborhood information 314 includes link quality information for the radio 308, which may be obtained from any combination of physical layer and data link data, and may be employed to adapt the data rate of communications according to currently present channel conditions. The neighborhood information may also include QoS data used to select next hops for QoS data. Other useful information may include bandwidth utilization, node weights, node position (either logical or physical), and queue latency for each QoS type and/or other priority type.

In one aspect, the neighborhood information 314 may be gathered during periodic exchanges (such as during control transmissions) with neighboring nodes, which may occur under control of the link manager of the data link 304. For example, the node 300 may determine output bandwidth (i.e., data transmit requirements) for each link that the node 300 has with a neighbor, and may transmit this to one-hop neighbors. Similarly, the node 300 may receive output bandwidth from each one-hop neighbor. Using this data, each node 300 may further calculate its own input bandwidth (i.e., data receive requirements) from each link to a neighboring node, and this information may in turn be exchanged with one-hop neighbors. Following a system-wide exchange with one-hop neighbors, the node 300 (and every other node in the MANET) may calculate a node weight that represents relative output requirements for the node 300. For example, the node weight, W, may be calculated as:

$$W = \frac{BW_{out}}{BW_{out} + BW_{in}} \quad [\text{Eq. 1}]$$

where $BW_{out}$ is the total output or transmit requirements for each link of the node 300, and $BW_{in}$ is the total input or receive requirements for each link of the node 300. Finally, the node 300 may transmit the node weight to each neighboring node, and may in turn receive a node weight from each neighboring node. It will be appreciated that the node weight, W, may be further processed for use with other neighborhood information 314, such as by limiting the value according to the number of bits used for control information, or by providing a supplemental adjustment to the node weight to further refine control of routing or other MANET functions. Sharing of information for maintenance of the neighborhood information 314 may be controlled, for example, by the data link 304, which may apply any suitable technique to determine when to share information with one hop neighbors. In one aspect, the data link 304 may transmit data whenever a change is detected in the MANET such as an addition or deletion of a node.

In another aspect, for a MANET that has location-aware nodes 300 (e.g., using Global Positioning System (GPS) data, signal strength data, and so forth), the neighborhood information 314 may include position data in order to support location-based routing and the like.

Having described a MANET in general terms, the description now turns to a more detailed treatment of multi-metric routing in the MANET.

FIG. 4 is a flow chart of a process for multi-metric routing in a MANET. In general, the process 400 operates to gather multi-metric data at a node in the MANET, and to apply the multi-metric data to route calculations, and ultimately to routing of packets.

The process 400 may begin 402 with receiving resource metrics from neighbors as shown in step 404. This may include a wide range of metrics and/or calculation results descriptive of data input and output requirements at neighboring nodes, and may span a one hop neighborhood, a two hop neighborhood, or some larger neighborhood. This may include neighborhood information acquired at a node as generally described above. In particular, output bandwidth may be usefully employed as a measure of data transmission requirements for a node relative to the node's access to time slots or transmission capacity. Output bandwidth may be calculated (after an exchange of information with neighboring nodes) as described generally above. The output bandwidth may also be manipulated for use with the systems described herein. For example, the output bandwidth value may represent an actual numerical value (or range of values) for the number of packets, or a relative value normalized according to the packet count for each queue. In one embodiment, the output bandwidth value may be determined relative to the total output data capacity for a node, such as a capacity based upon time slots allocated for the node to transmit using a weighted fair access technique, an unweighted fair access technique, or any other scheduling and/or access control mechanism employed by the node. Thus the output bandwidth value may provide a relative indication of queued data to output capacity. In one embodiment, a minimum or maximum value may be provided for the output bandwidth value. In an embodiment, a minimum or maximum increment size may be provided in order to limit the rate of change in the output bandwidth value. Thus for example, the bandwidth output may be tuned to rise immediately in response to an increasing queue depth, but may fall slowly in response to a decreasing queue depth.

More generally, the output bandwidth value may be tuned, weighted, or otherwise revised or adjusted to achieve a variety of scheduling objectives. For example, an environment where most nodes are expected to be downloading large quantities of identical data (e.g., streaming video) may be tuned for different performance than an environment where each node is expected to regularly source unique data (e.g., voice). In general, factors that may be accounted for in adjusting a calculation of output bandwidth include latency, throughput, overhead, number of channel frequencies, stability of the network, size of the network, and so forth. While these factors do not dictate a particular calculation for the output bandwidth value under any specific circumstances, they do illustrate the types of design objectives and trade offs that may be addressed by adjustments to the bandwidth output value calculation, each of which may serve to skew routing calculation in proportion to existing network traffic and network capacity. It will further be appreciated that the output bandwidth value calculation may also take account of varying traffic types, such as by weighting higher priority queues more heavily in the calculation, or by using a multiplier when high priority data is present in the queues.

As shown in step 406 data rates may be determined for links to neighboring nodes. Where the MANET employs an adaptive data rate system, the data rate for each link may vary according to the quality of the link. This value is nominally determined by a transmit waveform mode used on each link. The transmit waveform mode may be selected using any suitable adaptive data rate technique, and the corresponding nominal data rate may be adjusted as appropriate for overhead to account for packet header information, synchronization, and so forth. In one aspect, in order to assist in route cost calculations, a net data rate may be determined that reflects actual channel data rates as well as the number of time slots that a node currently receives for transmission over a shared air interface. Thus for example, a node that has twice as many transmit time slots as a neighbor may have twice as high an effective output data rate even where the transmit mode for the node and the neighbor are the same.

As shown in step 408, link reliability may be determined. Any suitable measure of link quality may suitably be employed. Reliability may be determined, for example, based upon physical layer data for the link, or some combination of physical layer and data link or network layer information. For example, each node may exchange packet count information with neighboring nodes providing counts for packets sent and packets received on each link. This data may be used, for example, to evaluate missed, dropped, or otherwise lost packets for each data link as described below. Each node may also obtain a Receive Strength Signal Indicator (RSSI) from a channel. This data may be obtained, for example, directly from the radio hardware for the node. It will be understood that while an RSSI is a common metric available from radio hardware, any suitable signal strength indicator may also, or instead, be employed. A link reliability value may be calculated using any of the above data. For example a ratio of sent-to-received packets may be obtained and weighted according to the RSSI. These values provide a useful metric that combines the actual, physical signal strength and the actual, observed packet integrity for a link. Other metrics may also, or instead, be employed, such as a signal-to-noise ratio, an average signal-to-noise ratio over a predetermined time interval, a bit-error rate (prior to any forward error correction), or a simple dropped packet count. The resulting link quality metric(s) may be usefully employed in a number of manners. In one aspect, the link reliability metric(s) may be stored and associated with the link for use in subsequent route calculations.

As shown in step 410, routes may be calculated. Any suitable cost-based route calculation may be employed in combination with the neighborhood resource metrics, data rates, and link reliability metrics described above. For example, a Dykstra Shortest Path First algorithm may be employed using these metrics as costs for each hop in a path. Quality of Service (QoS) may be incorporated into route calculations in a number of manners. In one aspect, where each node maintains different queues for different QoS service levels, queue latency or depth may be applied as a cost for service-level-specific calculations at each node. In another aspect, each service level, traffic type, or priority may have independent delivery parameters such as latency, throughput, and the like. Each parameter may be weighted or otherwise costed within the route calculation according to the service level. Thus a route calculation for each service level may result in a different route for each service level resulting from explicit costing of parameters associated with the service level, from current traffic as reflected in queues for various service levels, or from some combination of these or other explicit or implicit service-level-based costs.

By combining physical layer characteristics such as data rates, channel access, and link reliability with neighborhood-wide data concerning traffic patterns and demands at each neighboring node (as captured in node weights or the like, described above), different routes may be obtained for different service levels. While this approach may generally level loads within the network, load leveling is further improved by costing based on node resource metrics so that prospective routes avoid congested or otherwise impaired nodes within the network.

As shown in step 412, data may be routed according to the route(s) calculated in step 410. In general, this includes receiving a packet, identifying a service level for the packet which may be, for example, contained in the packet header, selecting a route for that service level, and then selecting an outbound link for the packet based upon the route for that service level. In one aspect, a tie breaking mechanism may be employed to more evenly distribute traffic over substantially equal cost routes. This may include, for example distribution among lower and higher IP addresses of packet destinations, odd and even IP addresses of packet destinations, or the like.

The process 400 may then return to step 404 where new route calculations are initiated with the collection of new resource metrics from neighbors. It will be understood that numerous additions, deletions, or modifications to the steps of the process 400 may be made without departing from the scope of this disclosure. For example, a variety of metrics may be employed from the network/data link layers of a protocol stack and from the physical layer, including any of the neighborhood information, link information, or other data described above, either alone or in various combinations. It will also be appreciated that the order of acquiring data may be varied, and may occur asynchronously. Thus physical layer data may be revised with each transmit or receive of data or at some other interval and may be averaged across a number of transactions, while neighborhood information may be updated on some regular interval such as one second, two seconds, or some other interval consistent with propagation of one hop or two hop neighborhood data through the MANET. Route costs may be calculated at any suitable corresponding or intermediate interval. In one embodiment, route costs are calculated after neighborhood information has been updated for all neighboring nodes. It will similarly be appreciated that numerous packets may be routed between updates to routing information. All such variations and modifications as would be apparent to one of ordinary skill in the art are intended to fall within the scope of this disclosure.

It will be appreciated that, while the foregoing description may apply to unicast or multicast routing, certain considerations will arise for each routing type, some details of which are discussed below.

In a unicast routing process, multi-level scoping may be employed to reduce routing update overhead for large networks. In such a process, each node may broadcast two types of control messages: an inter-scope message and an intra-scope message. The inter-scope message may be broadcast every five seconds or some other suitable interval, and may include only one hop neighbors. The intra-scope message may be broadcast at some longer interval, e.g., every fifteen seconds and may include all of the two-hops or more neighbors. Each node may store the topology information provided by the intra/inter scope messages in a topology table which includes both the inter-scope information and intra-scope information. The topology table may be checked once per second to determine whether or not there is a change in topology. If a change occurs then new routes may be computed using, e.g., the Dykstra Shortest Path First algorithm described above. As a result, the route on which a packet travels may become progressively more accurate as the packet approaches its destination. In one aspect, a node can export routes into IETF standard wired Internet routing protocols such as the Routing Information Protocol (RIP), the Open Shortest Path First (OSPF) protocol, or the Border Gateway Protocol (BGP) to support routing over multiple wireless and wired networks.

For multicast routing, a forwarding group may be employed to route multicast traffic to group members. Group membership may be established using a receiver advertisement scheme. Group membership and multicast routes may be established and updated by receivers on demand. Without leaving current groups, each node may periodically flood a member advertisement packet, referred to herein as a Join Request. Multiple Join Requests may be combined in a single control packet to reduce overhead. This periodic transmission may refresh membership information and update route information for corresponding multicast forwarding groups in view of any node movements. When a node receives a Join Request packet, the node may store multicast group identifiers, a source identifier, and a sequence number in a message cache (to detect duplicates). The previous node identifier may be stored as well. The Join Request may employ a hop count that is updated (e.g., decremented) on each hop, with an initial Time-To-Live value establishing a scope for the Join Request. When the Join Request packet reaches a multicast sender, the receiving node may create an entry in a member table that stores forwarding group information, or update an existing entry to indicate that a previous path is still available. Expired entries may be deleted from the member table after a predetermined time. In general, in such a scheme multicast senders do not send control packets. Rather, a node between senders and receivers can construct a forwarding group table by extracting information from the transient Join Request(s) in its member cache. In the forwarding group table, fore each multicast group identifier and sender identifier, a next node identifier may be set to the previous node identifier field in a Join Request.

No explicit control packets are required to leave a forwarding group. When a multicast receiver stops receiving packets for a particular group, that node may automatically stop responding to Internet Group Management Protocol (IGMP) or similar protocol queries, which will cause a timeout of entries in the node's member cache. This in turn causes the node to stop sending Join Requests, which will eventually time out the multicast route to that node throughout the forwarding group. In general, this multicast approach can coexist with any unicast routing protocol since routes are determined independently. Once established, forwarding groups may be used for multicast route calculations using any of the route calculation techniques described above.

A wide range of software and hardware platforms may be used to deploy the systems and methods described herein. Generally, the system components may be realized in hardware, software, or some combination of these. The components may be realized in one or more microprocessors, microcontrollers, embedded microcontrollers, programmable digital signal processors or other programmable devices, along with internal and/or external memory such as read-only memory, programmable read-only memory, electronically erasable programmable read-only memory, random access memory, dynamic random access memory, double data rate random access memory, Rambus direct random access memory, flash memory, or any other volatile or non-volatile memory for storing program instructions, program data, and program output or other intermediate or final results. The components may also, or instead, include one or more application specific integrated circuits (ASICs), dedicated semiconductor devices, programmable gate arrays, programmable array logic devices, or any other device that may be configured to process electronic signals.

Any combination of the above circuits and components, whether packaged discretely, as a chip, as a chip set, or as a die, may be suitably adapted to use with the systems described herein. It will further be appreciated that the above components may be realized as computer executable code created using a structured programming language such as C, an object oriented programming language such as C++, or any other high-level or low-level programming language that may be compiled or interpreted to run on one of the above devices, as well as heterogeneous combinations of processors, processor architectures, or combinations of different hardware and software. Any such combination of hardware and software suitable for use in an ad hoc network as described herein may be employed without departing from the scope of this disclosure.

Those skilled in the art will recognize, or will be able to ascertain using no more than routine experimentation, numerous equivalents to the systems and methods described herein. Such equivalents are considered to fall within the scope of the present invention. Moreover, the embodiments described herein are intended to exemplify the invention and not to limit it. While the invention is described above in connection with certain preferred embodiments, other embodiments may be understood by those of ordinary skill in the art. All such variations, modifications, extensions, additions, omissions, and the like as would be apparent to one of ordinary skill in the art are intended to fall within the scope of this disclosure, which is to be interpreted in the broadest sense allowable by law.

What is claimed is:

1. A method for determining routes in an ad hoc network comprising:
    receiving a resource metric from each one of a plurality of neighbors of a node, the resource metric indicative of network resources needed by the corresponding one of the plurality of neighbors, wherein the resource metric includes a node weight representing a ratio of bandwidth required for data in to bandwidth required for data out for a corresponding one of the plurality of neighbors, thereby providing a data link layer resource metric for a route calculation;
    determining a data rate for a link to each one of the plurality of neighbors using physical layer data that characterizes a rate of data selected according to the physical performance of a wireless communication channel, thereby providing a data rate metric for the route calculation;
    determining a reliability for a link to each one of the plurality of neighbors using physical layer data that characterizes a physical reliability of the wireless communication channel, thereby providing a reliability metric for the route calculation;
    applying the reliability metric, the data rate metric, and the data link layer bandwidth metric to the route calculation to calculate a plurality of routes within a scope of a Scoped Link State Routing (SLSR) protocol that employs multi-level scoping to reduce overhead, the plurality of routes including a route for each one of a plurality of service levels; and
    sharing network reachability information between a first router in the node for an ad hoc wireless network that routes data according to the SLSR protocol and a second router in the node for at least one wired network that routes data according to a protocol selected from the group consisting of Open Shortest Path First, Border Gateway Protocol, and Routing Information Protocol.

2. The method of claim 1 further comprising:
    receiving a data packet at the node, the data packet having a service level indicator; and
    routing the data packet according to the route for the service level.

3. The method of claim 1 wherein each one of the plurality of service levels imposes different requirements on the route calculation, whereby two or more of the service levels achieve different routing trees through the ad hoc network.

4. The method of claim 1 wherein the route calculation includes a Dykstra Shortest Path First algorithm.

5. The method of claim 1 further comprising load balancing network traffic by providing a tie breaking mechanism to distribute traffic among a number of substantially equal cost ones of the routes.

6. The method of claim 5 wherein the tie breaking mechanism is based upon destination Internet Protocol addresses.

7. The method of claim 1 wherein the route calculation is a unicast route calculation.

8. The method of claim 1 wherein the route calculation is a multicast route calculation.

9. The method of claim 8 wherein the multicast route calculation employs a forwarding group of nodes responsible for forwarding multicast traffic.

10. The method of claim 8 further comprising periodically flooding a member advertisement packet from the node to request membership in a multicast forwarding group.

11. The method of claim 8 further comprising receiving a join request from one of the plurality of neighbors and conditionally relaying the join request when a hop count for the join request does not exceed a predetermined threshold.

12. A computer program product comprising computer executable code stored in a non-transitory computer readable medium that, when executing on one or more computing devices, determines routes in a mobile ad hoc network by performing the steps of:
    receiving a resource metric from each one of a plurality of neighbors of a node, the resource metric indicative of network resources needed by the corresponding one of the plurality of neighbors, wherein the resource metric includes a node weight representing a ratio of bandwidth required for data in to bandwidth required for data out for a corresponding one of the plurality of neighbors, thereby providing a data link layer resource metric for a route calculation;

determining a data rate for a link to each one of the plurality of neighbors using physical layer data that characterizes a rate of data selected according to the physical performance of a wireless communication channel, thereby providing a data rate metric for the route calculation;

determining a reliability for a link to each one of the plurality of neighbors using physical layer data that characterizes a physical reliability of the wireless communication channel, thereby providing a reliability metric for the route calculation;

applying the reliability metric, the data rate metric, and the data link layer bandwidth metric to the route calculation to calculate a plurality of routes within a scope of a Scoped Link State Routing (SLSR) protocol that employs multi-level scoping to reduce overhead, the plurality of routes including a route for each one of a plurality of service levels; and sharing network reachability information between a first router in the node for an ad hoc wireless network that routes data according to the SLSR protocol and a second router in the node for at least one wired network that routes data according to a protocol selected from the group consisting of Open Shortest Path First, Border Gateway Protocol, and Routing Information Protocol.

13. The computer program product of claim 12 further comprising code that performs the steps of:
receiving a data packet at the node, the data packet having a service level indicator; and
routing the data packet according to the route for the service level.

14. The computer program product of claim 12 wherein the route calculation includes a Dykstra Shortest Path First algorithm.

15. The computer program product of claim 12 further comprising code that performs the step of load balancing network traffic by providing a tie breaking mechanism to distribute traffic among a number of substantially equal cost ones of the routes.

16. The computer program product of claim 12 wherein the route calculation is a unicast route calculation.

17. The computer program product of claim 12 wherein the route calculation is a multicast route calculation.

18. The computer program product of claim 17 wherein the multicast route calculation employs a forwarding group of nodes responsible for forwarding multicast traffic.

* * * * *